June 14, 1960   E. G. VONGERICHTEN   2,940,526
FLIGHT CONTROL FOR GYROPLANES
Filed Jan. 9, 1953   8 Sheets-Sheet 7

United States Patent Office 2,940,526
Patented June 14, 1960

2,940,526

FLIGHT CONTROL FOR GYROPLANES

Emile Georges Vongerichten, Meudon, France, assignor to Sud-Aviation Societe Nationale de Constructions Aeronautiques, Paris, France Filed Jan. 9, 1953, Ser. No. 330,449

Claims priority, application France Jan. 14, 1952

15 Claims. (Cl. 170—160.13)

The present invention relates to flight controls for aircraft provided with rotary wing structure, of the type comprising one or several rotors each provided with at least two variable pitch blades pivotally arranged on the hub, these rotors being caused to rotate either through a power supply such as a motor arranged on these propeller blades or aboard the aircraft, or through self rotation motion due to the displacement of the aircraft.

Such aircraft, respectively called helicopters and autogyros will be designated hereafter by the general term "gyroplanes," the term "base plane" standing for the plane in relation to which the chord of the straight section of a variable pitch blade airfoil section is at a constant pitch angle during the rotation of the blade.

It is known that gyroplanes provided with a direct cyclic pitch control are difficult to pilot due to their excessive control senitivity. The rotor of that kind of gyroplane reacts both too quickly and with a too great magnitude to an actuating action on the part of the pilot or to a balance condition change of the aircraft. The consequence thereof is that an untimely motion of the control column or that a casual condition acting on the gyroplane, as a squall for example, cause the latter to deviate from its equilibrium condition generating a periodic motion of the aircraft, the duration of which is short, but the amplitude of which keeps on rapidly increasing. Such a phenomenon is due to an absence or an insufficiency in damping and in return stroke moments suitably out of phase, in relation to the motion of the aircraft.

It therefore is a prerequisite to relation the rotor motions to the motions of the remainder part of the aircraft by means of a control device capable of creating the desired damping and phase shift.

Such a coupling device has already been proposed in the form of an aerodynamic servo-control, free from any important mass, and acting upon the rotor, but such a device is liable to cause out of control motions of the aircraft when flying at high speed or during rough turns.

Such a coupling of the gyroplane motions in relation to the rotor has also been realized by means of a gyroscopic member housed inside the fuselage, and having no incidence on the arrangement of the rotor and hub such as, for example, a centrifugal blower damped through a dash-pot; but in this case, the pilot, when operating the controls, has no action on the operation of the gyroscopic member and must consequently operate simultaneously the control of the aircraft and that of the gyroscopic device. Moreover, for such type of arrangements, both controls are generally actuated through hydraulic means, thus leading to serious complications.

On the other hand, a special gyroscopic member has been thought of, made of a bar provided with faired weights at its ends, arranged with its center on the hub of a two-bladed rotor and comprised in a plane substantially at right angles with respect to the longitudinal axes of the variable pitch blades. The pilot alters the pitch of the rotor blades by actuating a control, operating parallelly to, and independently from, the existing connection between the gyroscopic member and these variable pitch blades. The control of the rotor is therefore always direct and the sensitivity is only but very little changed with respect to an ordinary control, which was already the case for the preceding control.

It has also been proposed to have the rotor cooperate with a distinct regulator with aerodynamic action or gyroscopic member, the rotation axis of which does coincide or not with that of the rotor and is connected with the variable pitch blades of the latter in order to cause the absolute incidence of these blades to vary periodically either through separate or simultaneous modifications of their attack angle or of their trajectory. Moreover, in the case of some embodiments, either the inclination mechanism of the rotor and the pitch changing mechanism have been separated or the center of the inclination for the rotor and the pitch changing axes have been vertically separated by possibly adding to the corresponding devices inclination limiting devices arranged so as to hit the hub of the rotor for a shifted angular position of less than 90° to the rear from the longitudinal axis of the variable pitch blades in relation to the rotation center of the rotor.

Each of those systems has been designed in order to overcome drawbacks existing more or less in previous gyroplanes and the very number of these embodiments is a proof of the complexity of the problem to be solved on the one hand, and of the difficulties encountered in obtaining the possibly practical operation of a gyroplane, on the second hand.

After extensive tests, the applicant has succeeded in obtaining a coupling as perfect as can be between the motions of the sustaining rotor or rotors and those of the remainder part of the gyroplane with the desired damping and phase shift.

The main object of the present invention is to provide a flight control for aircraft with rotary wing structure of the type comprising at least one rotor of the type known as "mast-dependent rotor" provided with at least two variable pitch blades attached by hinges for flapping and by journals for feathering to a hub carried by the driving shaft of said rotor, giving the above mentioned result, said flight control being characterized by the fact that the cyclic pitch control device for the variable pitch blades of each sustaining rotor is connected to a gyroscopic flywheel the axis of which is made to be relationed to and controlled through the axis of the swash plate or ring which is arranged with a suitable annular play around the rotor driving shaft, this flywheel being connected to the variable pitch blade incidence levers in such a way that a tilting of its plane caused in a delayed manner by the tilting of the plane of this swash plate or ring entails, in its turn, a corresponding tilting in the same direction for the base plane of the rotor, the tilting of the plane of the swash plate or ring being ensured through a conventional cyclic pitch control from the control column. When the pilot does not operate the control column or when the latter is locked, the gyroscopic flywheel alone operates as stabilizing member. The gyroscopic flywheel rotates together with the shaft of the sustaining rotor on which it is centered by means of a universal joint enabling it to take any inclined position.

The gyroscopic wheel is preferably connected to the cyclic pitch control by directly arranging the rotary hub of this flywheel on the swash plate or ring.

Another object of the invention is to provide a flight control of the character described wherein the gyroscopic flywheel comprises inertia mass carrier arms pivotally arranged on the hub of said flywheel which rotates on the swash plate or ring, the articulation axes of these arms concurring in relation to the axis of the rotor driving shaft and being positioned at right angles with respect to these arms, each one of said arms being pivotally mounted on said hub by means of a damping device limiting the motion of said arm with respect to said hub. These damping devices are preferably of the hydraulic type. Each gyroscopic flywheel arm controls through a coupling rod the incidence lever of the rotor variable pitch blade which it precedes with respect to the rotation direction, slightly nearer said variable pitch blade than the preceding one. The gyroscopic flywheel arms are connected, moreover, by bars pivotally arranged on sliding and revolving rings carried by said arms. Said bars form a polygon when the rotor comprises more than two variable pitch blades.

The swash device formed by the swash ring proper and the gyroscopic flywheel hub just as every conventional swash device used for the control of sustaining rotors is provided with a driving compass connecting the same with the hub of the variable pitch blades and a general pitch control. The control of longitudinal and side inclination or of depth and warping is directly carried out through the control column connected to the swash plate or ring by means of rigid coupling rods, according to conventional arrangements. The control column is advantageously provided with resilient return devices withdrawing it to neutral position and with a longitudinal and cross adjustment for this position.

Lastly, according to the invention, the general pitch control operating the swash plate or ring comprises a fork the arms of which are pivotally arranged on this plate or ring around a diametral axis perpendicular to the rotor driving shaft and made to cooperate with a deformable oscillating device the general shape of which is a V, the legs of said V-shaped device being pivotally arranged on a fixed part integral with the housing of the rotor driving shaft, and the apex of said V-shaped device being pivotally arranged around the tail of that fork, the axis of said tail, which is oblique with respect to said rotor driving shaft, being perpendicular to said diametral axis. The dimensions of the fork and of the V-shaped deformable oscillating device are determined so that for the utilization zone of the general pitch control, the deformation of said device by articulation of its legs generates a displacement of the diametral axis, and consequently of the swash plate, which is parallel to the rotor driving shaft. On the other hand, the universal mounting of the swash plate, and consequently of the gyroscopic flywheel hub, is obtained by pivoting said plate around said diametral axis and/or around the axis perpendicular to said diametral axis and which passes through the fork tail pivotally mounted on the V-shaped deformable device.

During normal stabilized flight, the plane of the gyroscopic flywheel coincides with the plane of the swash plate or ring of the corresponding rotor. In case this plane is caused to have its position modified due to operation of the control column, for example, the gyroscopic flywheel remains at first in its initial direction in space under the action of the forces acting on the inertia masses.

The consequence is that the control plane or plane of the swash plate or ring and the plane of the gyroscopic flywheel do not coincide any more and that each of the gyroscopic mass carrier arms the position of which remains unchanged in space is caused to flap or oscillate with respect to the plane of the swash plate or ring. The resulting relative flappings or oscillations generate in each fluid damping device, one part of which is connected to the gyroscopic flywheel hub while its other parts are connected to the corresponding mass carrier arm, viscous rubbing forces in relation to the relative displacement speed. These forces apply to the gyroscope arms moments capable to damp the flappings or oscillations of said arms with respect to the plane of the swash plate while reducing the angular difference existing between the plane of the gyroscopic flywheel and the plane of the swash plate or ring. When the motion is completed, the two planes coincide again and the rotor blades are submitted to the desired pitch fluctuations. The gyroscope plane is made a function of the control plane or plane of the swash plate or ring and when the latter is inclined said gyroscope plane meets it after a certain delay and a motion of exponential nature.

The fact of controlling the incidence of the sustaining rotor propeller blades through a gyroscopic flywheel, the position of its axis being caused to be a function of the position of the swash plate or ring axis, provides the following advantages:

(1) Limitation in the response rapidity of the sustaining rotor due to the gyroscopic inertia effort and to the mechanical damping of the relative displacement of its masses with respect to the swash plate.

(2) Modifications of the characteristics of the natural periodic motion that the gyroplane undergoes if there is no action on the part of the pilot, modifications leading to greater duration period and a decrease in the successive amplitudes.

(3) No excessive piloting strain due to this limiting and stabilizing effect.

(4) Deadening and stopping the reactions of great frequency issued from the sustaining rotor and liable to be transmitted to the control column.

(5) Easier piloting as a consequence of his last fact, the pilot being free from any feeling of reactions or untimely motions.

(6) During progression flight, change of the balance position of the gyroscopic flywheel into a balance position for which the efforts are made nil in the control.

(7) Separation of the response rapidity control, which is a function of the stiffness of the damping devices, from the steering efficiency control which is a function of the reduction ratio existing in the transmission between swash plate or ring and control column.

(8) Removing all efforts on the control column when adjusting or centering.

The invention applies more particularly to the control of three-bladed rotors with flapping axis and drag axis on each variable pitch blade. The stability of the gyroplane is thus increased in relation to the moderation of the response rapidity of the sustaining rotor controlled through the gyroscopic flywheel due to the inertia effort developed through this flywheel and due to the damping of the relative displacement motion of the masses which are carried by its arms.

However, according to that embodiment, the moderation of the response rapidity of the rotor in relation to the pilot's operation may only be adjusted within very narrow limits, this being for certain cases a drawback, whereas in other cases, such as for school helicopters or crane helicopters, such a moderation is, on the contrary, an advantage.

With a view of adjusting more advantageously the moderation of the response rapidity of the sustaining rotor in relation to the pilot's operation, the consequence of which is to increase the ease in control of the aircraft, another object of the invention is to provide in a flight control of the character described means for partially and momentarily modifying the incidence of the variable pitch blades in relation to the displacement imposed by the pilot to the swash plate or ring during the response delay period of the gyroscopic flywheel.

With a view of attaining this result, the connecting rod of each incidence lever of the rotor variable pitch blades is only momentarily controlled through the sole swash plate or ring during a fraction of the response delay period of time of the gyroscopic flywheel under the action of the pilot, in such a way that the incidence of the variable pitch blades is then controlled in the conventional way through a coupling rod linking directly the incidence lever to the swash plate or ring.

According to an advantageous embodiment, the rod controlling the incidence lever of each variable pitch blade is arranged so that its end controlled by the gyroscopic flywheel be pivotally mounted on one of the arms of a knee lever pivotally mounted on the gyroscopic flywheel hub and the other arm of which is connected through a small coupling rod to a lever oscillatively arranged about the oscillating axis of the corresponding gyroscopic flywheel arm and made fast with this arm, this lever, this small coupling rod and the knee lever arm to which it is fixed forming a parallelogram.

When the pilot tilts the swash plate or ring, the gyroscopic flywheel, as hereinabove disclosed, does not follow straight away the control motion, the knee lever moves in a direction parallel with itself and the end of the connecting rod controlling the incidence lever of the variable pitch blade which is somehow only connected to the swash plate or ring, is caused to move in relation to the displacement motion performed by the knee lever axis.

Now, when the gyroscopic flywheel to which are applied the rubbing viscous forces taking place in the damping members undergoes moments causing its plane to coincide with that of the swash plate or ring, the knee lever tilts over together with this plate or ring causing the connecting rod to move within a distance constituting that delayed control fraction of its total displacement motion. The lever integral with the corresponding gyroscopic flywheel arm may be provided with several apertures for fixing the connecting rod to the knee lever, with a view to adjust the fraction of delayed control with respect to the total control.

The device according to the invention shows the advantage of enabling to adjust the moderation of the response rapidity to the pilot's actuations, thus resulting in improved ease in the control.

Considering the aircraft itself, this improvement in control ease is obtained at the cost of stability, but by acting on other flight control factors of the gyroplane, mainly on the gyroscopic masses, on the damping members and on the ratio of the lever arms for the device hereabove specified, it is possible to maintain the same stability while improving the ease in control.

The description hereunder with reference to the appended drawings, given only by way of mere examples, will enable to fully understand how the invention may be put into practice, the particular features of the device described being obviously within the scope of the invention.

For the sake of simplification in the illustration, the figures show an helicopter provided with a three-bladed rotor. But the invention relates to gyroplanes having one or several rotors each provided with at least two variable pitch blades.

Figure 1:
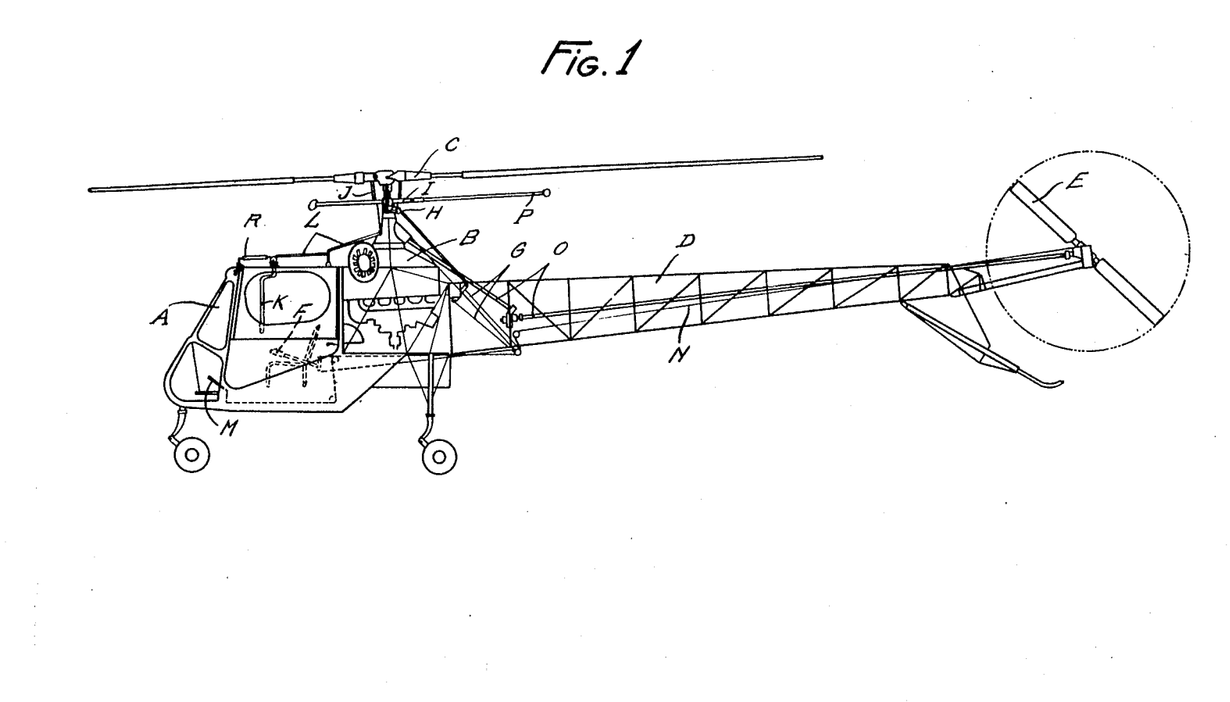
Figure 1 is an overall view showing an helicopter provided with a control device according to the invention.

The helicopter shown in Figure 1 comprises a cabin for the pilot and a motor member B driving the sustaining rotor C, the cabin A extending to the rear through a tail D carrying an auxiliary rotor E operating as directing and ani-torque member.

The flight control of the aircraft comprises a general pitch control by means of a lever F operating through cables G a transmitting device H, operating in its turn the swash ring I connected to the sustaining rotor C through a system of small coupling rods J. On the other hand, the cyclic pitch control is taken care of through the control column K connected to the swash ring I through a transmitting device L.

The direction control is carried out through pedals M operating the auxiliary rotor E by means of cables N, this rotor being driven through a transmitting member O controlled by the motor B.

According to the invention, the swash ring I serves as support to a gyroscopic flywheel provided with inertia masses P cooperating with a device making the position of its axis a function of the position of the swash ring axis, the control column K being provided with adjustable resilient devices R for the return to neutral position.

Figure 2:
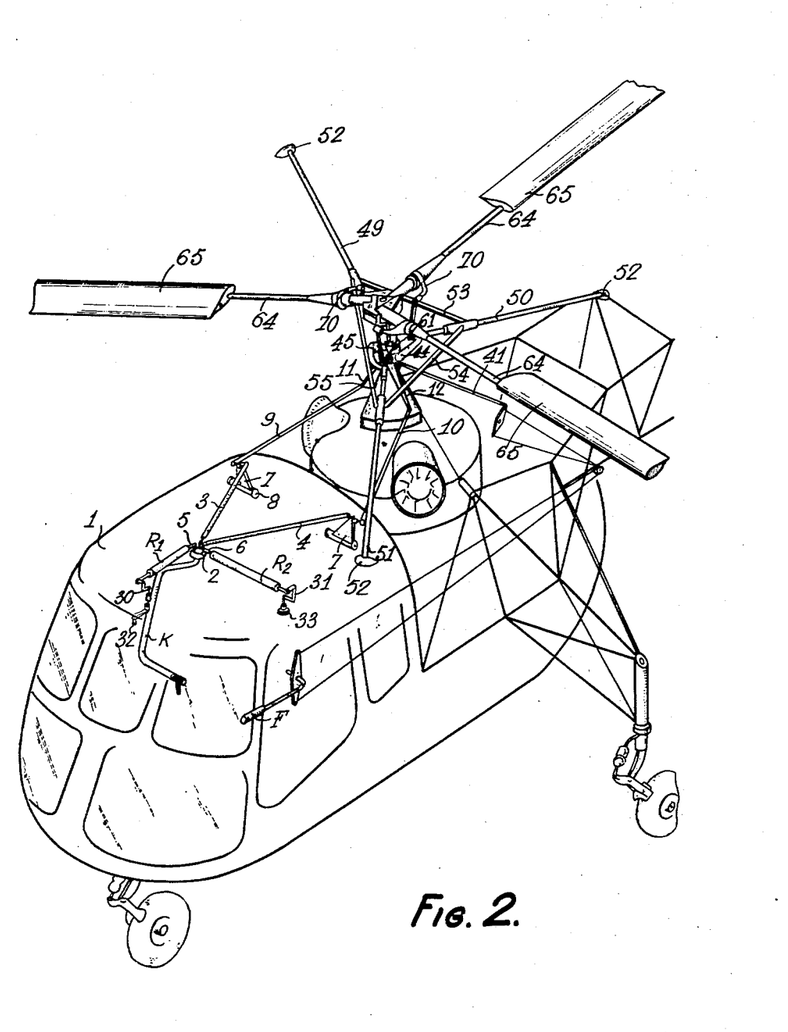
Figure 2 is a perspective view, at a greater scale, showing the flight control device arranged on the helicopter shown in Figure 1 supposing the latter transparent and the attaching supports of the various members on the helicopter omitted.
Figure 3:
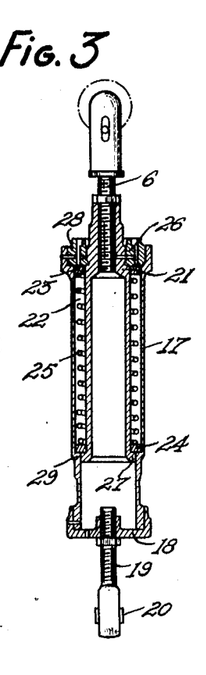
Figure 3 is a longitudinal section of one of the adjustment devices for centering the control column.

The transmitting device L and the resilient return device R are illustrated in Figs. 2 and 3.

Figure 4:
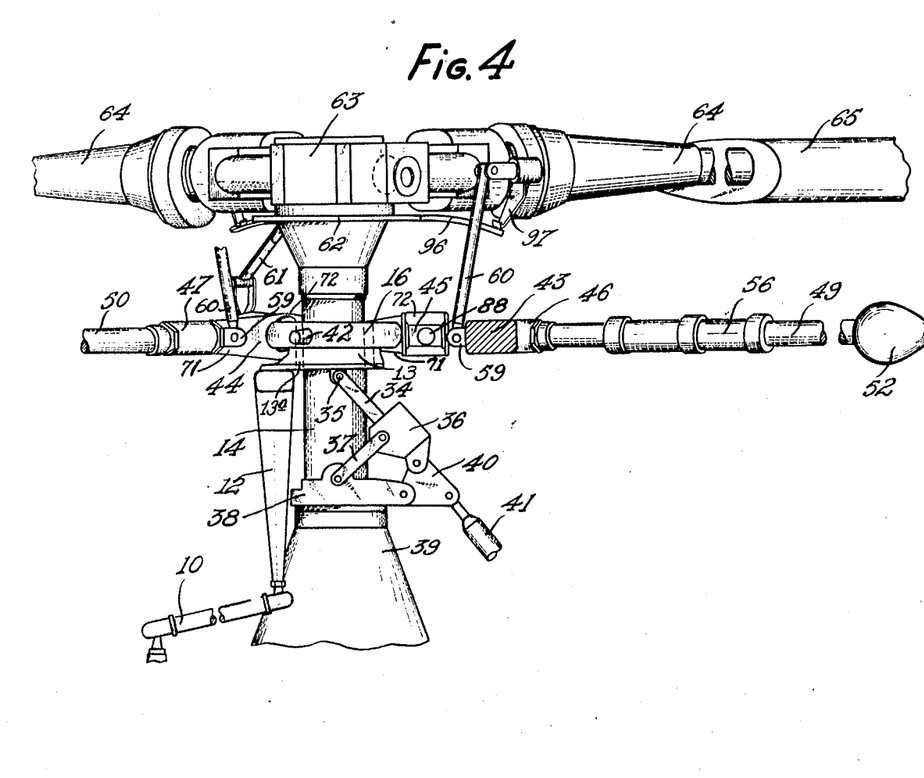
Figure 4 is an elevation view of the assembly comprising the sustaining rotor, the gyroscopic flywheel and the control members for that flywheel, one of the sustaining rotor variable pitch blades being removed, and supposing that the bars connecting the arms to each other have been removed as well as the left part of the lever supporting the right arm, up to the section line IV—IV in Fig. 5.
Figure 5:
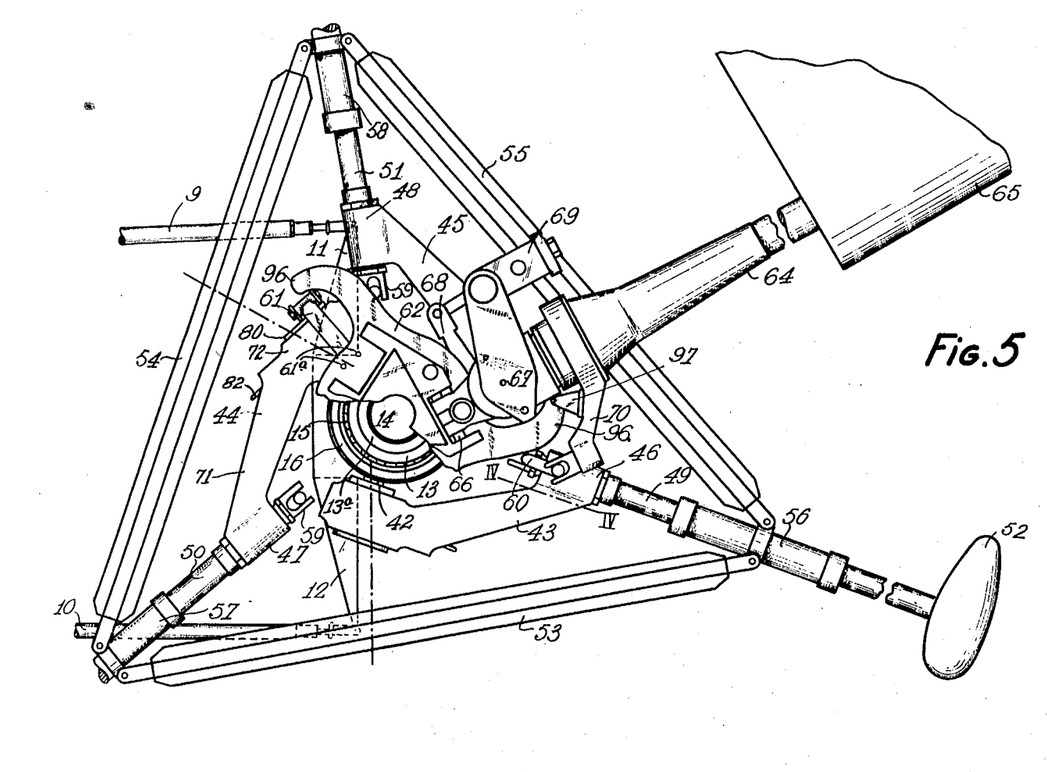
Figure 5 is a plane view corresponding to Fig. 4 in which two sustaining rotor variable pitch blades have been removed, the hub of this rotor being partly broken off.

The control column K goes through the ceiling 1 of cabin A and terminates with a ball device housed in a casing 2 fixed onto this ceiling 1. The ball device, housed in the casing 2 extends above this casing through four pivots on which are pivotally arranged, on the one hand, two small coupling rods 3 and 4 directed towards the rear of the aircraft and, on the other hand, two rods 5 and 6 controlling resilient control column return devices R1 and R2. The other ends of the small coupling rods 3 and 4 are pivotally arranged on levers 7 pivotally arranged about axes 8, and on which are pivotally arranged two coupling rods 9 and 10 which, in their turn, are pivotally arranged on two control V-shaped legs 11 and 12 called whiskers (Figs. 2, 4 and 5). Legs 11 and 12 are fixed on a swash ring 13 arranged with an annular play 13a around the driving shaft 14 for allowing a limited inclination of said swash ring in any direction with respect to said shaft, i.e. a universal movement of said swash ring; this ring is further supported by the control of the general pitch so as to be able to tilt in every direction with respect to this shaft 14 and/or to be displaced parallelly to this shaft.

Ring 13 constitutes the normal swash plate and around this swash ring is arranged, by means of a ball bearing 15, a three branch star coupling member 16 supporting the arms of the gyroscopic flywheel and acting as a hub to the latter, this star coupling member being capable of rotating on the swash ring 13 and tilting simultaneously with this ring.

The resilient return adjustable device R for withdrawing the control column K to neutral position comprises (Fig. 2) two spring boxes, R1 for depth and R2 for warping, these spring boxes cooperating with the adjustment devices.

Each of these spring boxes, as it may be seen in Fig. 3, comprises a hollow member 17 the one end of which is closed by a plug 18 integral with an eyelet rod 19 provided with a ball bearing 20, while through its other end passes a piston 21 connected with rod 5 or 6 fixed on one of the pivots of ball member 2.

Between the piston 21 and the body 17 a spacing 22 is provided for housing two washers 23 and 24 between which is arranged a spring 25 maintained by these two washers. The washers 23 and 24 may be moved against the action of the spring by means of two stops 26 and 27 pertaining to the piston or abutting members 28 and 29 pertaining to the casing.

The simultaneous arrangement of the spring boxes R1 and R2, as shown in Fig. 2, enables to provide for resilient return to neutral position of the control column K through the reaction of the spring 25 on washers 23 and 24.

The eyelet rods 19 are connected to a system of levers 30 for the depth control and 31 for the warping control. A crank 32 for controlling depth and a wheel 33 for controlling warping enable to operate the eyelet rods 19 by means of the system of levers 30 and 31 in order to adjust the neutral position of the control column K.

Universal arrangement of the swash ring 13 mounted with the annular play 13a around the rotor shaft 14 with relation to said rotor shaft is carried out by means of the transmitting device H for general pitch and the legs 11 and 12 for cyclic pitch.

The transmitting device H comprises (Fig. 4): a fork 34 provided with arms pivotally arranged at 35 on swash ring 13 around a diametral axis perpendicular to shaft 14. The tail of fork 34 the axis of which is oblique with respect to said shaft and perpendicular to said diametral axis, is pivotally arranged in a casing 36. Said casing is connected through a pair of connecting rods 37 to a support 38 integral with the housing 39 of the rotor shaft. A triangular part 40 both pivotally arranged on casing 36 and on support 38 is pivotally arranged, on the other hand, through a ball device on the connecting rod 41 controlling the general pitch and actuated by lever F.

When the pilot wishes to alter the general pitch by acting on connecting rod 41, he causes the triangular part 40 to pivot on support 38 which generates pivotal movements of casing 36 on said triangular part 40, of connecting rods 37 on support 38 and casing 36, and of fork 34 on swash ring 13. The dimensions of members 34, 36, 37 and 40 as well as the relative locations of their pivotal points are determined so that for the possible variations of the general pitch said pivotal movements generate a displacement of pivotal points 35, and consequently of swash ring 13, parallelly the driving shaft 14.

Figure 11:
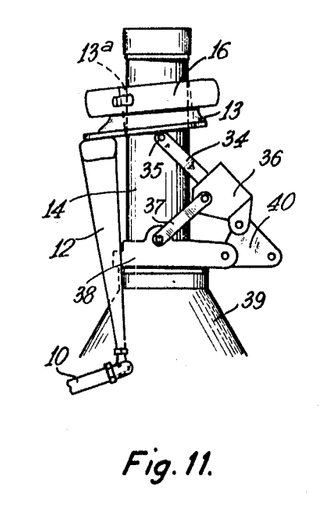
Figure 11 illustrates the relationship existing between the swash ring and the driving shaft in the case of a depth control.
Figure 12:
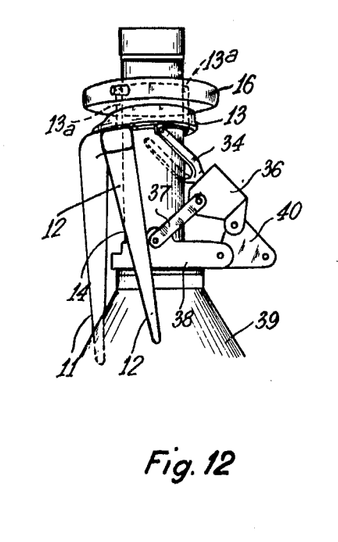
Figure 12 illustrates the relationship existing between the swash ring and the driving shaft in the case of a warping control.

When the pilot wishes to alter the cyclic pitch by acting on legs 11 and 12, he causes the assembly formed by said legs and the swash ring 13 either to pivot around the diametral axis passing through articulations 35 by simultaneously pulling or pushing said legs, in the case of a depth control for example, as illustrated in Fig. 11, or to pivot around the axis of the fork tail, which is perpendicular to said diametral axis, by pushing and pulling said legs respectively, in the case of a warping control, as illustrated in Fig. 12. Said two pivotal movements result from the universal mounting of the swash ring 13 about two perpendicular axes, namely the diametral axis passing through articulations 35 and the axis of the fork tail. Obviously said two pivotal movements may be combined for simultaneously obtaining the depth and warping controls.

The swash plate I formed by ring 13 supports the star coupling member 16 provided with three bevel branches 42. On these branches are pivotally arranged three levers 43, 44 and 45 with damping devices terminating in reamed heads 46, 47 and 48, the ream axes of which are at right angles to the bevel branches 42 corresponding to the articulation axes of the damping members. Extending arms 49, 50 and 51 are arranged in the reamed heads 46 to 48 and meet on the axis of the driving shaft 14. A fairing mass such as 52 is fixed to the outside end of each arm.

Arms 49 to 51 are connected through three bars 53, 54 and 55 of section iron, for example, forming a triangle the apices of which are pivotally arranged on rings 56, 57 and 58 capable of sliding along, and rotating on arms 49 to 51. This arm assembly thus arranged builds up the gyroscopic flywheel, each of the arms terminating towards the inside in a yoke 59 in which is pivotally arranged the rod 60 controlling the incidence of the next following rotor variable pitch blade. The driving of the gyroscopic flywheel as well known in the art is ensured by a compass 61 the upper leg of which is pivotally arranged on a yoke fixed at 61a under an iron sheet 62 fixed itself to the hub 63 of the rotor while its lower leg is pivotally mounted on a member connected with one of the bevel branches 42, thus ensuring that the gyroscopic flywheel is driven at the same speed as that of the sustaining rotor variable pitch blades.

The sustaining rotor comprises three arms 64 supporting the sustaining variable pitch blades 65. These arms are pivotally arranged, on the one hand, on the hub 63 through axes 66, flapping axes orthogonal in relation to the axis of shaft 14 and, on the other hand, about axes 67, drag axes located in planes parallel with axis 14. These blades are, moreover, connected through levers 68 to damping members 69.

The incidence of the variable pitch blades 65 is adjusted by means of incidence levers 70 integral with arms 64 and connected through small coupling rods 60 to the yokes 59 of the gyroscopic flywheel arms. In a plane view, the arms 49 to 51 of the gyroscopic flywheel are substantially fixed between the variable pitch blades, nearer to those blades that they precede and the incidence of which they control.

Figure 6:
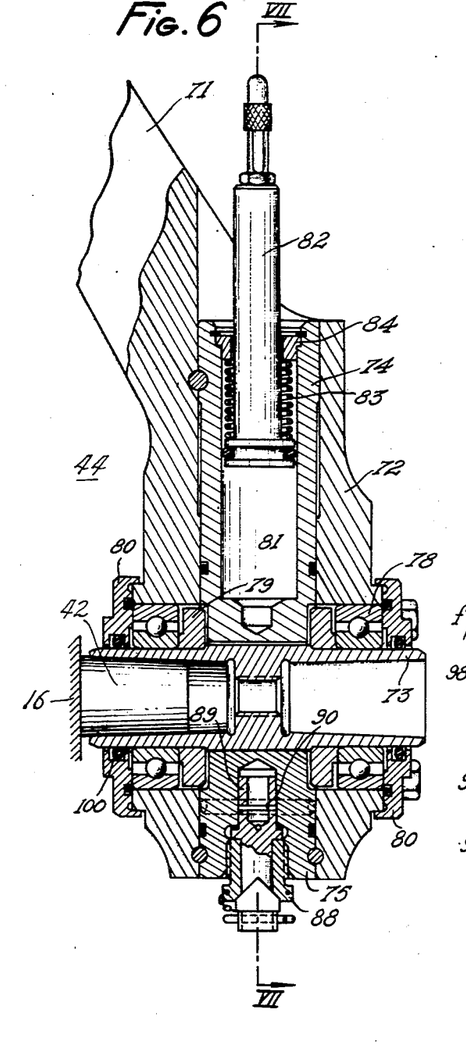
Figures 6 and 7 are section views of the damping device, in planes at right angles respectively.
Figure 7:
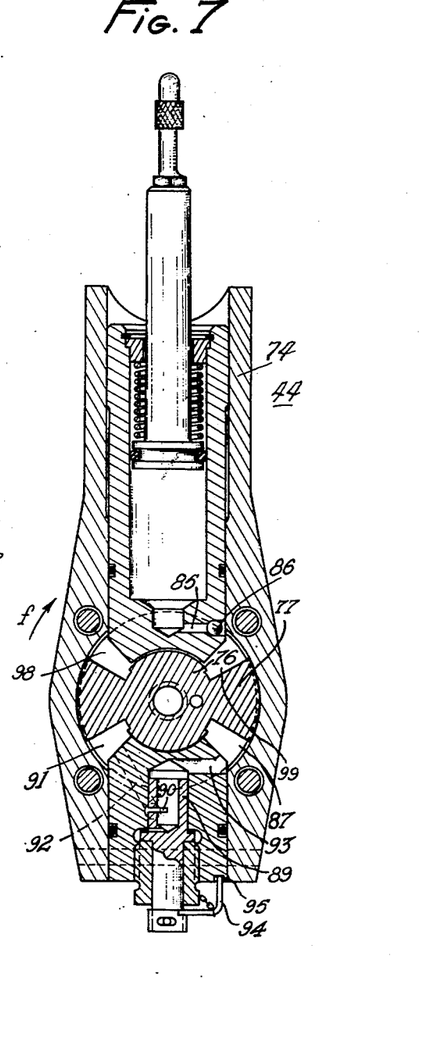

As shown in Figs. 6 and 7 illustrating the damping lever 44, each damping lever comprises a leg 71 terminating in a damping body 72 in which is arranged a socket 73 fixed on the bevel branch 42 and formed with two blades 77. On the other hand, the body 72 is provided with two diametrally opposite radial members 74 and 75 between which the hub 76 of socket 73 oscillates and which define with blades 77 four chambers 87, 91, 98 and 99. These chambers are laterally limited by rings 79 on which bear the inner rolling races of ball bearings 78 carried by body 72, the whole assembly being kept in place by means of covers 80, fixed through screws, for instance, upon the body of the apparatus.

The socket is made tight through the provision of rubber twisted seals 100, housed in covers 80. The top radial member 74 is provided with an inner bore 81 in which a piston 82 may move against the action of a spring 83 held by a guiding washer 84.

The bore 81 communicates through a channel 85 closed by a ball 86 with the chamber 99. The lower radial member 75 is provided with a screwed in adjusting tap 88 the hollow bush 89 of which comprises a slot 90 causing chambers 91 and 87 to communicate by means of channels 92 and 93. The action of the slot 90 may be adjusted by turning the tap 88, the latter being held in the desired position by means of a lug device 94, the lug of which cooperates with a set of slots 95 provided in the lower lining 75.

The piston 82 may be provided with marks indicating, on the one hand, that the damping member is filled with liquid and, on the other hand, that the damping member needs filling.

The operation of the damping member just described is the following:

When the gyroscopic flywheel arm integral with the damping lever is caused to move along the direction shown by arrow f with respect to the corresponding bevel branch 42, and consequently to socket 73, body 72 moves according to said arrow f as well as radial members 74 and 75. The pressure exerted by the top radial member 74 on the liquid contained above the blade 77 in the chamber 99 the volume of which decreases, causes the ball 86 to bear against its seat, thus closing the channel 85, and the relative motion of body 72 with respect to blades 77 causes the throttling of the liquid between the socket 76 and the top radial member 74 for passing to chamber 98 the volume of which increases. Simultaneously, the liquid contained under the blades 77 passes from chamber 91, the volume of which decreases, to chamber 87, the volume of which increases, through channel 92, slot 90 and channel 93. When the gyroscopic flywheel arm moves in the reverse direction to that shown by arrow f with respect to the related bevel branch 42, the liquid is caused to circulate between chambers 87 and 91 through channel 93, slot 90 and channel 92 and between chambers 98 and 99 by throttling between the socket 76 and the top radial member 74, the eventual necessary balance of liquid being then able to be provided from reserve 81 through the lifting of ball 86.

The iron sheet 62 integral with the hub 63 extends in three bent legs 96 (Figs. 4 and 5) slightly bent downwards and on which may rest fingers 97 fixed on the incidence levers 70 in order to hold the gyroscopic flywheel in a position at right angles to the rotor axis, when the variable pitch blades are not rotating and in view of further launching. The variable pitch blades are then stopped towards the lower section of the hub and the lever F is maintained in the launching position during rest and the launching sets the swash ring 13 at a height corresponding to the minimum incidence, the fingers 97 then resting on the bent legs 96; under these conditions, the coupling rods 60 keep the gyroscopic flywheel in a position substantially at right angles with respect to the rotor axis.

The operation of the device thus described is the following:

If the pilot wishes to operate the depth control for landing, the rotor being in stable condition for which the planes of swash ring 13 and gyroscopic flywheel coincide, he actuates the control column K for driving the levers 7 backwards, the result of which is to cause a backwards oscillation of legs 11 and 12 (Fig. 11) causing the swash ring 13 and the star coupling member 16 or gyroscopic flywheel hub to tilt with respect to their initial stable position by pivotal movement around the diametral axis passing through articulations 35. At first, the plane of the gyroscopic flywheel remains unchanged as well as the incidence angle of the rotor blades and each of the flywheel arms at each revolution is caused to flap or oscillate relatively to the new plane of the swash ring by passing alternately over and below said plane in the direction of arrow f of Fig. 7 and in the reverse direction. The arms 71 and bodies 72 of the damping levers 43 to 45 are therefore caused to oscillate about the axes of the bevel branches 42, and consequently about the sockets 73 provided with blades 77 and fixed on said branches, thus giving way in the damping members to viscous rubbing forces in relation to the displacement speed due to the various displacements of the liquid between the chambers 87—91 and 98—99, as hereinabove disclosed. These forces apply onto arms 49 to 51, positioned at right angles with respect to branches 42, moments causing the motion of the gyroscopic flywheel arms in such a way that their plane is made to coincide with the control plane or swash ring plane. A spectator rotating with the gyroscopic flywheel and looking at one arm thereof would see the decreasing of the flappings or oscillations of said arm with respect to the plane of the swash ring until said relative oscillations stop. At this time, no moment being applied to the arm, this latter rotates in a plane which coincides with the swash ring plane. During their transient movement the three arms 49 to 51 rest in a common plane passing by the center of the swash ring. On the other hand, the triangular structure formed by bars 53 to 55 and rings 56 to 58 interconnecting the three arms 49 to 51 avoids any tendency of said arms to deviate from their common plane under the action of secondary oscillations such as, for example, accelerations acting on the whole gyroplane. The thus described movements of the gyroscopic flywheel arms cause by means of the small coupling rods 60 the cyclical modification of the pitch of the sustainer rotor variable pitch blades.

If the pilot wishes to operate the warping control to bank, the rotor being in a stable condition for which the plane of swash ring and gyroscopic flywheel coincide, he actuates the control column K for driving the levers 7 in oppoiste directions, the result of which is to cause backwards and forward oscillations of legs 11 and 12 respectively (Fig. 12). The oscillations of said legs in reverse directions cause the swash ring 13 and star coupling member 16 or gyroscopic flywheel hub to tilt with respect to their initial stable position by pivotal movement around the axis of the tail of fork 34 which is pivotally mounted in casing 36. Coincidence of the gyroscopic flywheel plane with the new plane of this swash ring is restored in the same way as hereabove indicated in the case of landing.

It should be well understood that modifications may be considered in relation to the device herewith described without outreaching the scope of the invention. In particular, the gyroscopic flywheel could, instead of being arranged directly on the swash ring or plate, be arranged above the corresponding sustaining rotor, this flywheel being in that case supported by a central control for general pitch and connected to the swash ring or plate through a coupling rod and lever system cooperating with damping members.

Figure 8:
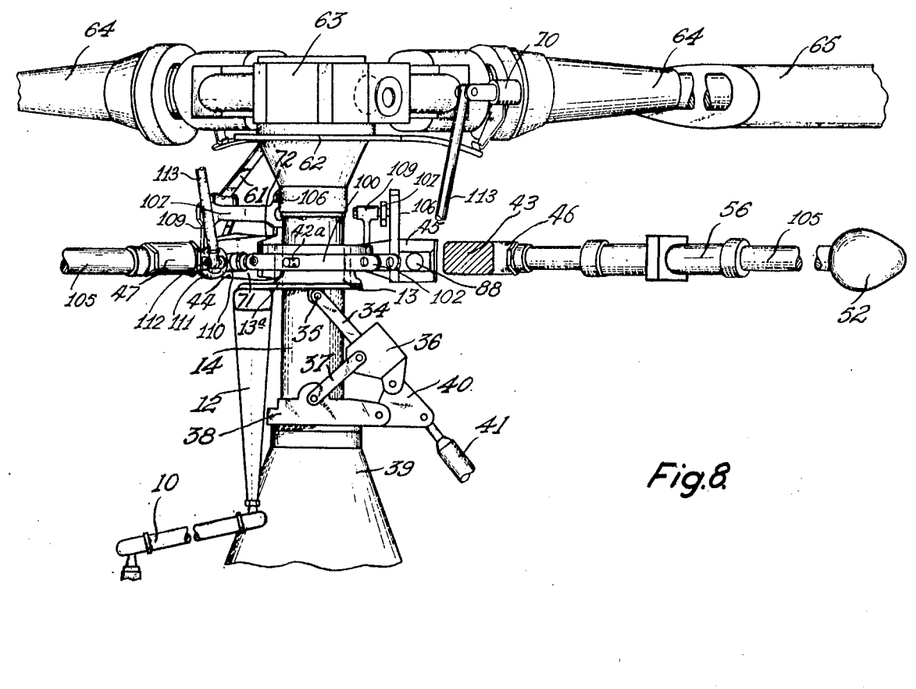
Figure 8 is an elevation view of the assembly according to the invention comprising the sustaining rotor, the gyroscopic flywheel and the control members for this flywheel, one of the sustaining rotor variable pitch blades being removed, supposing that the bars linking the arms to each other have been removed, as well as the left part of the lever supporting the right arm of the gyroscopic flywheel up to a section located in front of this arm.
Figure 9:
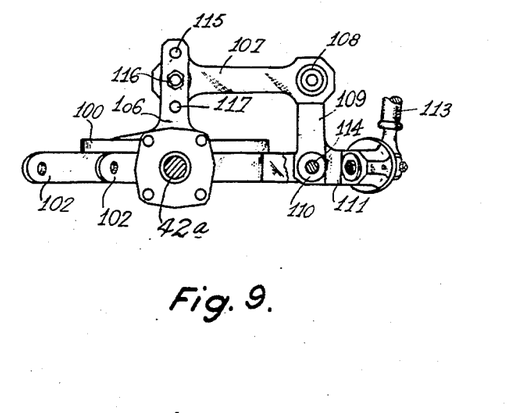
Figure 9 is an elevation view of the device for improving the control ease according to the invention, supposing that the lever supporting the corresponding arm of the gyroscopic flywheel has been removed.
Figure 10:
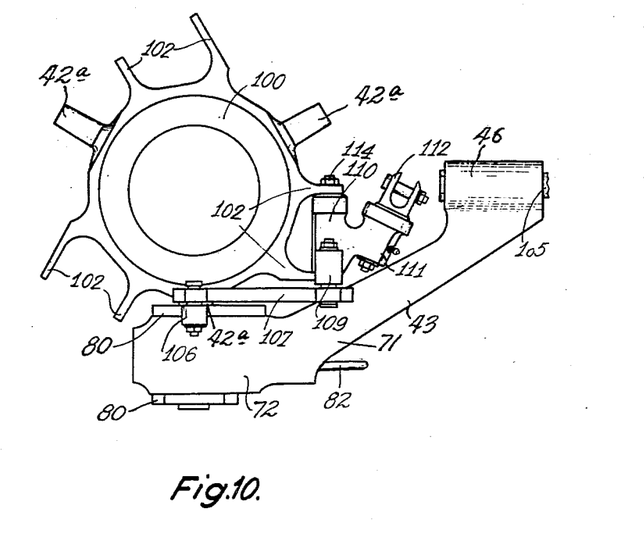
Figure 10 is a plane view showing the coupling star member for the swash ring provided with a device for improving the ease in control according to the invention and of the corresponding gyroscopic flywheel arm.

In the embodiment shown in the Figures 8 to 10, the control device for the swash ring 13 is similar to that shown in Figs. 2, 4 and 5. The control arms such as 12 to which are transmitted the pilot's actuaitons through coupling rods such as 10, are fixed on the swash ring 13, arranged around the driving shaft 14 with an annular play 13a. On swash ring 13 is arranged, by means of ball bearings, a coupling star member 100 provided with three bevel branches 42a and three yokes 102 spaced between branches 42a respectively. This coupling star member is liable of rotating with respect to the swash ring 13 and of tilting together with it.

The universal arrangement of the swash ring 13 with respect to the rotor shaft 14 is carried out, as hereinbefore described for the embodiment illustrated in Figs. 1 to 5, by means of a transmitting device comprising a fork 34 the legs of which are pivotally arranged at 35 on the ring 13 around a diametral axis perpendicular to shaft 14. The tail of fork 34 the axis of which is oblique with respect to shaft 14 and perpendicular to said diametral axis, is pivotally arranged in a casing 36, said casing being connected through a pair of coupling rods 37 to a support 38 integral with the housing 39 of the rotor shaft. A triangular part 40 pivotally arranged on casing 36 and support 38 is, on the other hand, pivotally arranged through a ball device on the small coupling rod 41 controlling the general pitch.

On the three bevel branches 42a of the coupling star member 100 are pivotally arranged three damping levers 43 to 45 terminating in three bored heads 46 to 48, the bore axes being at right angles with respect to the bevel branches 42a corresponding to the axes of the damping members.

Inside the bored heads 46 to 48 are arranged extending arms 105 that meet on the axis of the driving shaft 14. A faired mass such as 52 is fixed on the outside end of each arm 105. The arms 105 are linked by three bars not shown, such as bars 53, 54 and 55 in Fig. 5, forming a triangle the apices of which are pivotally arranged on rings 56 liable to slide along and rotate about arms 105. The gyroscopic flywheel thus embodied is driven, as in the embodiment shown in Figs. 4 and 5, by a compass 61 the top leg of which is pivotally arranged on a yoke fitted onto an iron sheet 62, fitted itself to the hub 63 of the rotor.

The sustaining rotor comprises three arms 64 carrying the sustaining variable pitch blades 65. These arms are pivotally arranged, on the one hand, on the hub 63 through flapping axes orthogonal with respect to the axis of shaft 14 and, on the other hand, about drag axes located in planes parallel with axis 14. These variable pitch blades are moreover connected to damping members by means of levers. The incidence of the variable pitch blades 65 is adjusted through incidence levers 70 integral with arms 64. In a plane view, the gyroscopic flywheel arms 105 are substantially maintained between the variable pitch blades nearer to those blades they precede and for which they control the incidence.

The damping member with which is provided each damping lever 43 to 45 is of the type described with respect to Fgures 6 and 7. On the front section of each damping lever 43 to 45 next to the coupling star member 100 is fixed a lever 106 centered on the bevel branch 42a and on which is pivotally arranged a small coupling rod 107 provided with ball bearings 108, the other end of this small coupling rod being pivotally arranged on one arm 109 of a knee lever 110 pivotally arranged itself on a shaft 114 located in the yoke 102 in front of which passes the corresponding damping arm. On the second arm 111 of the knee lever 110 is pivotally arranged a yoke 112 on which is pivotally arranged a coupling rod 113 the other end of which is pivotally arranged on the incidence lever 70.

The incidence of each sustaining variable pitch blade is controlled through a device such as the one described hereabove and shown in Figs. 9 and 10.

The operation of the control thus described is the following, with respect to each gyroscopic flywheel arm and corresponding variable pitch blade:

When the rotor has attained a stable condition for which the planes of the swash ring 13 and of the gyroscopic flywheel coincide, if the pilot causes the swash ring 13 and the star coupling member 16 to tilt with respect to their initial position by pivotal movements around the diametral axis passing through articulations 35 and/or around the fork tail axis through actuating coupling rods 9 and 10 and legs 11 and 12, the plane of the gyroscopic flywheel remains unchanged at the beginning and each of its arms, as hereinabove disclosed, flaps or oscillates with respect to the new plane of the swash ring. Said swash ring drives together with its motion the knee levers 110 that move in a direction parallel to themselves by means of the coupling rods 107 pivotally arranged at 116, and the coupling rods 113 move along and their displacements are equal to those of shafts 114 of the knee levers, thus causing corresponding displacements of the incidence levers 70 which entail a transient and limited cyclical modification in the pitch of the sustaining rotor variable pitch blades. During the same time, as hereinabove indicated, and due to the action of the relative oscillations of the damping levers 43 to 45 and of the arms 105 about the axes of the bevel branches 42a, viscous rubbing forces in relation to the displacement speed occur in the damping members. These forces apply onto arms 105 the orientation of which is at right angle with respect to branches 42a, moments causing the displacement of the gyroscopic flywheel so as to cause its plane to coincide with the control plane, that is the swash ring plane. Levers 106 tilt and, owing to the action of the small coupling rods 107, the knee levers tilt about their shafts 114 causing displacements of the coupling rods 113 the result of which is the final cyclical modification of the pitch for the sustaining rotor variable pitch blades.

The lever 106 is provided with three adjusting apertures 115, 116 and 117 enabling to vary that fraction of delayed control in the general control of the sustaining rotor, this fraction being decreased when passing from aperture 115 to aperture 117.

It should be well understood that modifications may be made with respect to the device described without outreaching the scope of the present invention.

What I claim is:

1. A flight control for aircraft with rotary wing structure of the type comprising at least one rotor provided with at least two variable pitch blades attached by flapping hinges and by feathering journals to a hub secured on the driving shaft of said rotor, comprising, in combination, for each rotor, a cylindrical swash ring for controlling the general pitch and the cyclic pitch of the variable pitch blades of said rotor mounted with an annular play around the rotor driving shaft, a slidable universal joint means carrying said cylindrical swash ring for allowing its displacement parallel to the rotor shaft axis and its inclination with respect to said axis, a general pitch control connected with said cylindrical swash ring for displacing the same parallelly to the driving shaft axis, a cyclic pitch control connected with said swash ring for inclining the axis of the same with respect to said driving shaft axis, a gyroscopic flywheel mounted with an annular play around said driving shaft and having radial arms the number of which is equal to that of the rotor blades, faired masses respectively secured on the outer ends of said radial arms, means for maintaining said radial arms in a common plane, means for respectively connecting said radial arms with the incidence levers of the blades, a hub for centering said gyroscopic flywheel on said swash ring, a ball bearing interposed between said hub and the outer cylindrical surface of said swash ring, articulated means with viscous damping action for connecting said radial arms with said centering hub, and means for mechanically connecting in rotation said flywheel with said shaft.

2. A flight control for gyroplanes, according to claim 1, wherein the means for maintaining the radial arms in a common plane comprises slidable and rotatable rings respectively supported by said arms, and rigid bars articulated on said rings for forming a polygon articulated on its apices.

3. A flight control for gyroplanes, according to claim 1, wherein the slidable universal means and the general pitch control comprise a fixed member integral with the housing of the rotor shaft, a pair of lateral connecting rods articulated on said fixed member, a lever articulated on said fixed member, a supporting member articulated on the other ends of said rods and on said lever, a fork member articulated on the swash ring about a diametral axis perpendicular to the driving shaft axis and having a tail pivotally mounted on said supporting member about an axis oblique with respect to the driving shaft axis and perpendicular to said diametral axis, and a control rod arctiulated on said lever, whereby the swash ring pivots about the diametral axis passing by the articulation points of the fork member on the swash ring and about a second axis constituted by the articulation axis of the pivoting tail of said fork member, said two axes defining a universal joint.

4. A flight control for gyroplanes, according to claim 1, wherein the cyclic control comprises two V-shaped control legs secured under the swash ring, a control column pivotally arranged with respect to the ceiling of the cabin of the gyroplane, a rod and lever transmission between said control column and said control legs, means for returning the control column to neutral position, and means for adjusting said neutral position.

5. A flight control for gyroplanes, according to claim 1, wherein the cyclic control comprises two V-shaped control legs secured under the swash ring, a control column passing through the ceiling of the cabin and terminating by a ball element, a spherical casing housing said ball element and secured on said ceiling, four pivots carried by said ball element and projecting over said casing, two small coupling rods respectively pivotally mounted on two of said pivots diametrically opposed with respect to said ball element and directed according to perpendicular directions, two boxes within which said small coupling rods are longitudinally movable, said boxes carrying at their opposed ends eyelet rods, two springs housed in said boxes and adapted to be deformed by the relative displacements of said small coupling rods with respect to said boxes, two bell crank levers articulated over said ceiling and connected with said eyelet rods, means controlled by the pilot for oscillating said bell crank levers with a view to adjust the neutral position of said control column, two controlling rods pivotally mounted on the other pivots secured on the ball element and the angle of which characterizes the response sensitivity for depth and warping of the flight control, two levers articulated over the ceiling of the cabin and on which are pivotally mounted the other ends of said control rods, and two coupling rods pivotally mounted on said levers and on said legs.

6. A flight control for gyroplanes, according to claim 1, further comprising means for maintaining the gyroscopic flywheel in a position substantially perpendicular to the driving shaft axis, when the latter is at rest.

7. A flight control for gyroplanes, according to claim 6, wherein the means for maintaining the gyroscopic flywheel in a position substantially perpendicular to the axis of the rotor driving shaft, when the latter is at rest, comprises stop devices secured on the rotor hub, and limitating fingers supported by the incidence control levers of the blades for contacting said stop devices when the rotor is at rest.

8. A flight control for aircraft with rotary wing structure of the type comprising at least one rotor provided with at least two variable pitch blades attached by flapping hinges and by feathering journals to a hub secured on the driving shaft of said rotor, comprising, in combination, for each rotor, a cylindrical swash ring for controlling the general pitch and the cyclic pitch of the variable pitch blades of said rotor mounted with an annular play around the rotor driving shaft, a slidable universal joint means carrying said cylindrical swash ring for allowing its displacement parallel to the rotor shaft axis and its inclination with respect to said axis, a general pitch control connected with said swash ring for displacing the same parallelly to the driving shaft axis, a cyclic pitch control connected with said swash ring for inclining the axis of the same with respect to said driving shaft axis, a gyroscopic flywheel mounted with an annular play around said driving shaft and having radial arms the number of which is equal to that of the rotor blades, faired masses respectively secured on the outer ends of said radial arms, means for maintaining said radial arms in a common plane, means for respectively connecting said radial arms with the incidence levers of the blades, a hub for centering said gyroscopic flywheel on said swash ring formed with radial pivots the number of which is equal to that of said arms, a ball bearing interposed between said hub and the outer cylindrical surface of said swash ring, members for mounting said arms on said hub about said radial pivots in an angularly offset relationship between the axes of said pivots and of said arms, hydraulic damping devices interposed between said mounting members and said pivots, and means for mechanically connecting in rotation said flywheel with said shaft.

9. A flight control for aircraft with rotary wing structure of the type comprising at least one rotor provided with at least two variable pitch blades attached by flapping hinges and by feathering journals to a hub secured on the driving shaft of said rotor, comprising, in combination, for each rotor, a cylindrical swash ring for controlling the general pitch and the cyclic pitch of the variable pitch blades of said rotor mounted with an annular play around the rotor driving shaft, a slidable universal joint means carrying said swash ring for allowing its displacement parallel to the rotor shaft axis and its inclination with respect to said axis, a general pitch control connected with said swash ring for displacing the same parallelly to the driving shaft axis, a cyclic pitch control connected with said swash ring for inclining the axis of the same with respect to said driving shaft axis, a gyroscopic flywheel mounted with an annular play around said driving shaft and having radial arms the number of which is equal to that of the rotor blades, faired masses respectively secured on the outer ends of said radial arms, means for maintaining said radial arms in a common plane, means for respectively connecting said radial arms with the incidence levers of the blades, a hub for centering said gyroscopic flywheel on said swash ring, said hub being formed with outwardly projecting radial pivots the number of which is equal to that of the rotor blades, a ball bearing interposed between said centering hub and the outer cylindrical surface of said swash ring, hydraulic damping devices the inner parts of which are mounted on said pivots, levers mounted on the outer parts of said damping devices and carrying said radial arms, the axes of said radial arms being perpendicular to those of said pivots, and a driving compass fixed on the hub supporting the variable pitch blades and on the gyroscopic flywheel hub.

10. A flight control for gyroplanes, according to claim 9, wherein the means for connecting the radial arms with the incidence levers of the variable pitch blades comprises yokes substantially fitted along the axes of the arms at their inner ends, and rods respectively articulated on said yokes and on the incidence levers of the variable pitch blades that they precede in the rotation direction, slightly nearer to said blades than to the blades preceding them.

11. A flight control for gyroplanes of the type having one rotor provided with three variable pitch blades attached by hinges for flapping and by journals for feathering to a hub secured on the driving shaft of said rotor, comprising, in combination, a swash plate controlling the general pitch and the cyclic pitch of the variable pitch blades mounted with an annular play around the rotor driving shaft and formed with an outer cylindrical surface, a slidable universal joint means carrying said swash plate for allowing its displacement parallel to said axis and its inclination with respect to said axis, a gyroscopic flywheel mounted with an annular play around said driving shaft and having three radial arms, faired masses respectively secured on the outer ends of said radial arms, means for maintaining said radial arms in a common plane, means for respectively connecting said radial arms with the incidence levers of the blades, a hub for centering said gyroscopic flywheel on said swash plate, said hub being formed with three outwardly projecting radial pivots, a ball bearing interposed between said centering hub and the outer cylindrical surface of said swash plate, three hydraulic damping devices the inner parts of which are mounted on said pivots, three levers mounted on the outer parts of said damping devices and carrying said radial arms, the axes of said radial arms being perpendicular to those of said pivots, a driving compass fixed on the driving shaft hub and on the gyroscopic flywheel hub, a general pitch control connected with said swash plate for displacing the same parallelly to the driving shaft axis, and a cyclic pitch control connected with said swash plate for inclining the axis of the same with respect to said driving shaft axis.

12. A flight control for aircraft with rotary wing structure of the type comprising at least one rotor provided with at least two variable pitch blades attached by flapping hinges and by feathering journals to a hub secured on the driving shaft of said rotor, comprising, in combination, for each rotor, a cylindrical swash ring for controlling the general pitch and the cyclic pitch of the variable pitch blades of said rotor mounted with an annular play around the rotor driving shaft, a slidable universal joint means carrying said swash ring for allowing its displacement parallel to the rotor shaft axis and its inclination with respect to said axis, a general pitch control connected with said swash ring for displacing the same parallelly to the driving shaft axis, a cyclic pitch control connected with said swash ring for inclining the axis of the same with respect to said driving shaft axis, a gyroscopic flywheel mounted with an annular play around said driving shaft and formed with radial arms the number of which is equal to that of the rotor blades, faired masses respectively secured on the outer ends of said radial arms, means for maintaining said radial arms in a common plane, rods connecting said radial arms with the incidence levers of said blades, a hub for centering said gyroscopic flywheel on said swash ring, said hub being formed with outwardly projecting radial pivots the number of which is equal to that of the rotor blades, a ball bearing interposed between said centering hub and the outer cylindrical surface of said swash ring, hydraulic damping devices the inner parts of which are mounted on said pivots, levers mounted on the outer parts of said damping devices and carrying said radial arms, the axes of said radial arms being perpendicular to those of said pivots, a driving compass fixed on the hub supporting the variable pitch blades and on the gyroscopic flywheel hub, and means for momentarily controlling the rods interconnecting said radial arms and the incidence levers at first by a direct action of the swash ring, when the inclination of the latter with respect to the rotor driving shaft is modified from a stable position, during a first fraction of the response delay period of the gyroscopic flywheel axis to said modification in inclination, then by the delayed action of said gyroscopic flywheel during the remaining fraction of said response delay period.

13. A flight control for gyroplanes, according to claim 12, wherein the means for momentarily controlling the rods by the swash ring and for controlling the same by the gyroscopic flywheel comprise, for each rod, a knee lever articulated on the gyroscopic flywheel hub, one of the arms of said knee lever being connected with one end of the rod, the other end of which is pivotally mounted on the incidence lever of the corresponding blade, a straight lever secured on the lever supporting the arm, and a rod connecting said straight lever with the second arm of said knee lever.

14. A flight control for gyroplanes, according to claim 13, wherein the lever, the connecting rod and the leg of the countershaft connected with said connecting rod form a parallelogram.

15. A flight control for gyroplanes, according to claim 13, wherein the lever is formed with a plurality of apertures for fixing the coupling rod connected to the countershaft.

References Cited in the file of this patent

UNITED STATES PATENTS

| | | |
|---|---|---|
| 2,368,698 | Young | Feb. 6, 1945 |
| 2,384,516 | Young | Sept. 11, 1945 |
| 2,457,429 | Young | Dec. 28, 1948 |
| 2,489,343 | Wasserman et al. | Nov. 29, 1949 |
| 2,519,762 | Hoffman et al. | Aug. 22, 1950 |
| 2,633,924 | Young | Apr. 7, 1953 |
| 2,640,553 | Hafner | June 2, 1953 |
| 2,646,848 | Young | July 28, 1953 |

FOREIGN PATENTS

| | | |
|---|---|---|
| 590,011 | Great Britain | July 7, 1947 |
| 649,910 | Great Britain | Feb. 7, 1951 |
| 652,817 | Great Britain | May 2, 1951 |
| 675,657 | Great Britain | July 16, 1952 |